United States Patent
Shimizu et al.

(10) Patent No.: US 8,307,448 B2
(45) Date of Patent: Nov. 6, 2012

(54) STORAGE DEVICE, STORAGE METHOD, AND IMAGE DISPLAY DEVICE

(75) Inventors: Yukitaka Shimizu, Narashino (JP); Ryoji Ohno, Matsudo (JP); Akio Ichikawa, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1168 days.

(21) Appl. No.: 11/632,721

(22) PCT Filed: Jul. 8, 2005

(86) PCT No.: PCT/JP2005/012660
§ 371 (c)(1), (2), (4) Date: Jan. 18, 2007

(87) PCT Pub. No.: WO2006/008986
PCT Pub. Date: Jan. 26, 2006

(65) Prior Publication Data
US 2008/0052536 A1    Feb. 28, 2008

(30) Foreign Application Priority Data
Jul. 23, 2004   (JP) .................................. 2004-216044

(51) Int. Cl.
G06F 21/00    (2006.01)
(52) U.S. Cl. ......................................................... 726/26
(58) Field of Classification Search ............... 726/26–33
See application file for complete search history.

(56) References Cited

U.S. PATENT DOCUMENTS

| | | | |
|---|---|---|---|
| 7,477,749 B2 * | 1/2009 | Pippuri | 380/284 |
| 2002/0048365 A1 | 4/2002 | Namiki et al. | |
| 2002/0083284 A1 | 6/2002 | Matsubara et al. | |
| 2002/0126843 A1 | 9/2002 | Murase et al. | |
| 2002/0188567 A1 | 12/2002 | Candelore | |

(Continued)

FOREIGN PATENT DOCUMENTS
EP    1069564 A2    1/2001
(Continued)

OTHER PUBLICATIONS

Mycom Journal, "New standard of iVDR that enables Super-distribution of contents", Japan, Mainichi Communications Inc., Apr. 13, 2004.

(Continued)

Primary Examiner — Farid Homayounmehr
Assistant Examiner — Lisa Lewis
(74) Attorney, Agent, or Firm — Birch, Stewart, Kolasch & Birch, LLP (57) ABSTRACT

When data whose storage period is limited by copy control information is temporarily stored in a removable recording medium, the data are encrypted and decoding information (encryption key) necessary to decrypt the encrypted data is held on the device side. By doing so, the data cannot be used beyond a permitted period of the temporary storage. A storage device has an external input/output I/F for removably connecting a removable recording medium; a reception section for receiving copy control information and data (such as video data), the storage period of which data is limited by the copy control information; an encrypting section for encrypting the received data; and a control section for storing the encrypted data in the removable recording medium and storing decryption information (encryption key), necessary to decrypt the encrypted data, in a place in the storage device, outside the removable recording medium. The data stored in the removable recording medium can be reproduced only by the storage device.

6 Claims, 8 Drawing Sheets

U.S. PATENT DOCUMENTS

| | | | |
|---|---|---|---|
| 2003/0012375 A1 | 1/2003 | Sako et al. | |
| 2003/0077074 A1 | 4/2003 | Okamoto et al. | |
| 2003/0120942 A1 | 6/2003 | Yoshida et al. | |
| 2004/0049648 A1 | 3/2004 | Sato et al. | |
| 2005/0160053 A1* | 7/2005 | Okamoto et al. | 705/67 |
| 2005/0273827 A1* | 12/2005 | Javed et al. | 725/90 |
| 2008/0091900 A1* | 4/2008 | Imai et al. | 711/163 |
| 2008/0310826 A1* | 12/2008 | Okamoto et al. | 386/124 |

FOREIGN PATENT DOCUMENTS

| | | |
|---|---|---|
| EP | 1220217 A2 | 7/2001 |
| EP | 1233414 A2 | 8/2002 |
| EP | 1256950 A1 | 11/2002 |
| JP | 6-95871 A | 4/1994 |
| JP | 2000-098885 | 4/2000 |
| JP | 2000-98885 A | 4/2000 |
| JP | 2001-326920 | 11/2001 |
| JP | 2002-116833 | 4/2002 |
| JP | 2002-149841 A | 5/2002 |
| JP | 2002-196982 A | 7/2002 |
| JP | 2002-203368 A | 7/2002 |
| JP | 2003-085142 | 3/2003 |
| JP | 2003-140976 | 5/2003 |
| JP | 2003-186751 | 7/2003 |
| JP | 2003-186751 A | 7/2003 |
| JP | 2003-187524 | 7/2003 |
| JP | 2003-333030 | 11/2003 |
| JP | 2004-186825 A | 7/2004 |
| WO | WO-02/084526 A2 | 10/2002 |

OTHER PUBLICATIONS

Digital Transmission Content Protection Specification vol. 1 (Informational Version) (Feb. 28, 2005).

ARIB Operational Guidelines for BS/Broadband CT Digital Broadcasting, ARIB TR-B15, Ver. 2. 9, vol. 8 (Feb. 2004).

ARIB Service Information for Digital Broadcasting System ARIB STD-B10, Ver. 3 (Feb. 2004).

* cited by examiner

| RETENTION STATE | RETENTION TIME |
|---|---|
| 000 | NO LIMIT |
| 001 | 1 WEEK |
| 010 | 2 DAYS |
| 011 | 1 DAY |
| 100 | 12 HOURS |
| 101 | 6 HOURS |
| 110 | 3 HOURS |
| 111 | 90 MINUTES |

STORAGE DEVICE, STORAGE METHOD, AND IMAGE DISPLAY DEVICE

TECHNICAL FIELD

The present invention relates to a storage device, a storage method, and an image display device, and more particularly, to a device and a method for storing streams containing copy control information such as digital broadcasting, and to a storage device, a storage method, and an image display device for temporarily storing and then viewing and listening a stream that is prohibited from copying by the copy control information on a recording medium.

BACKGROUND OF THE INVENTION

Copy Control Information is added to digital data to protect the copyright of the data. In DTCP (Digital Transmission Content Protection, refer to non-patent document 1), for example, the Copy Control Information is recorded in CCI (Copy Control Information) which is transmitted simultaneously with a stream or EMI (Encryption Mode Indicator) that is included in a packet header as two-bit information. The following four categories of copy control are assigned by the two-bit information: Copy-free (permitted to copy without restriction), No-more-copies (permitted to copy once), Copy-one-generation (prohibited from dubbing), Copy-never (prohibited from copying).

A stream assigned to Copy-free is permitted of both storage and recording. Here, the "storage" means a recording process by which the stream can be played back only by the apparatus recording the stream, while "recording" means a recording process by which the stream can be played back by other apparatuses. A stream assigned to Copy-one-generation can also be permitted of both storage and recording by reassigning the CCI of the stream as No-more-copies. A stream assigned to No-more-copies is neither permitted of storage nor recording. On the other hand, although a stream assigned to Copy-never is not permitted of recording, storage is permitted for the time designated as Retention Time in Retention State Field transmitted simultaneously with a stream only in the case to display the stream with a certain delay. The Retention State consists of three-bit information, and the relationship of the three-bit information and Retention Time is as shown in FIG. 9.

Figure 9:
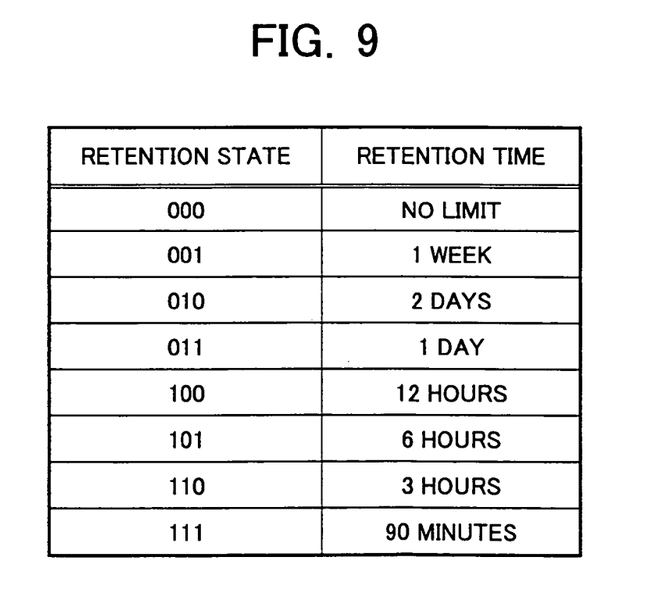
FIG. 9 shows the relationship between Retention State (3-bit information) and Retention Time.

FIG. 9 shows the relationship between Retention State (three-bit information) and Retention Time. As is shown, a stream can be stored for the durations assigned as Retention Time corresponding to each status of Retention State.

Similar operations are being carried in BS/CS digital broadcastings (for example, refer to non-patent document 2, non-patent document 3). In these cases, information corresponding with CCI or EMI is digital recording control data contained in digital copy control description elements which are transmitted simultaneously with a stream. The digital recording control data are two-bit data, and the states of "copy permitted without restriction", "copy permitted only one generation", "copy prohibited" are assigned to the value of the data. A category equivalent to "copy permitted only once" is not assigned in broadcasting field but is interpreted as "copy prohibited".

Durations of temporary storage are designated by retention mode (one-bit data) and retention state (three-bit data). This means that even a stream assigned to "copy prohibited" is permitted to be stored temporarily for the duration designated by retention state in the case retention mode is assigned as zero. The function "displaying a stream with a certain delay" described above is typically effectuated as a time shift function of a recorder equipped with an internal hard disk drive(s).

Conventionally, a stream has been assigned to one of three states when it is stored. The first state is "copy permitted without restriction" for storing a Copy Free stream. The second state is "copy permitted only once" for storing a Copy Once stream. The third state is "temporary storing" for storing a Copy Never stream. A stream assigned to "temporary storing" is required to disable its content to be played back after a designated duration has lapsed.

Concerning the disabling of a content to be played back, in patent document 1, for example, a method is disclosed to disable a content to be played back by generating an encryption key based on random numbers that change with time and by canceling the retention of random numbers after a given duration.

In patent document 2, a recordable play-back equipment with a storage (AV-HDD) equipped with an internal timer is disclosed, which has a function to delete copy-prohibited data when a designated time has lapsed.

Patent Document 1: Japanese Laid-Open Patent Publication No. 2003-333030

Patent Document 2: Japanese Laid-Open Patent Publication No. 2003-140976

Non-patent document 1: Digital Transmission Content Protection Specification Volume 1 (Informational Version)

Non-patent document 2: Association of Radio Industries and Businesses (ARIB), "Operational Guidelines for BS/Broadband CS Digital Broadcasting", ARIB TR-B15, Ver. 2. 9, Vol. 8, February 2004

Non-patent document 3: Association of Radio Industries and Businesses (ARIB), "Service Information for Digital Broadcasting System" ARIB STD-B10, Ver. 3. 8, Feb. 2004

DISCLOSURE OF THE INVENTION

Problems to be Solved by the Invention

Viewed from a different angle, temporary storing of a content on a detachable storage has not been well considered. For example, it is impossible to temporarily store a content on a rewritable DVD (Digital Versatile Disk) by a mode adopted by the above mentioned DVD because in the case a DVD is purposely taken out during a record-prohibited stream is being recorded by shutting off the power, the content already recorded can be utilized by other storages without limitation.

On the contrary, recordable play-back equipment disclosed in the patent document 2 mentioned above is able to temporarily store image data on an externally connected apparatus (AV-HDD). However, the said recordable play-back equipment is required to have a clock and a timer that are equipped internally. Since conventional hard disk drives do not have an internal clock for the use as an ordinary storage device, equipping an internal clock and a timer to that hard disk drive becomes a factor to increase manufacturing cost.

The present invention was conceived in consideration of the situation described above, and it is therefore an object of the present invention to avoid the illegal utilization of data beyond the designated term of temporary storing by encrypting data whose storage term is limited by CCI when the data are temporarily stored in a detachable storage, and then by retaining a decryption information (e.g., an encryption key) to decrypt the encrypted data on the main apparatus side.

It is another object of the present invention to provide a storage device, storing method, and an image display device which are designed so that the data cannot be illegally utilized beyond a designated term of temporary storing by realizing a simple device using a conventional detachable storage without modification with additional parts as an internal clock and an internal timer.

Means for Solving the Problems

In order to solve the above problems, a first technical means of the present invention is a storage device storing data in a removable recording medium, comprising an encrypting section to encrypt data whose storage period is limited and a storage control section that stores the encrypted data in the recording medium and stores the license information including both decryption information required to decrypt the encrypted data and expiration date information for limiting storage period of the data in a fixed secure region of the recording medium.

A second technical means is the storage device according to the first technical means, wherein the storage control section counts the period for which the data is stored in the recording medium and updates expiration date information of the data in accordance with the period counted.

A third technical means is the storage device according to the first or second technical means, wherein the storage control section is enabled to store the data together with attribute information for identification of the data in the recording medium.

A fourth technical means is the storage device according to the third technical means, wherein the storage control section deletes the data whose expiration date is expired when the storage device is initialized.

A fifth technical means is the storage device according to the first technical means, comprising a reception section to receive broadcasting data on which copy control information is superimposed, wherein the storage control section generates license information of the data encrypted by the encrypting section from the copy control information and stores the generated license information in the secure region.

A sixth technical means is a storage method for storing data in a removable recording medium, comprising the steps of encrypting data whose storage period is limited and storing the encrypted data in the recording medium and storing license information including both decryption information required to decrypt the encrypted data and expiration date information for limiting storage period of the data, in a fixed secure region of the recording medium.

A seventh technical means is an image display device having an input/output unit to removably connect a recording medium and a storage unit to temporarily store data in the recording medium, wherein the storage unit comprises an encrypting section to encrypt data whose storage period is limited and a storage control section that stores the encrypted data in the recording medium and stores license information including both decryption information required to decrypt the encrypted data and expiration date information for limiting storage period of the data, in a fixed secure region of the recording medium.

Effect of the Invention

Illegal utilization of the data beyond the designated term of temporary storing limited by CCI can be prevented by encrypting data when the data are temporarily stored in a detachable storage, and then by retaining a decryption information (e.g., an encryption key) to decrypt the encrypted data on the main apparatus side.

Further, the manufacturing costs of the storage device will not increase unlike the application of conventional techniques, since the apparatus can prevent illegal utilization of the data beyond a designated term of temporary storing by simply applying a conventional removable storage without modification with additional parts as an internal clock and an internal timer.

EXPLANATIONS OF REFERENCE NUMERALS

1, 101 . . . storage device; 2, 102, 202 . . . external input/output I/F; 3, 103 . . . reception section; 4, 104 . . . user I/F; 5, 105 . . . control section; 6, 106 . . . encrypting section; 7, 107 . . . reproduction section; 8, 108 . . . buffer; 9, 109 . . . operation input means; 10, 110, 201 . . . display means; 11, 111 . . . removable recording medium; 200 . . . image display device; and 203 . . . holding section.

PREFERRED EMBODIMENTS OF THE INVENTION

Although a removable hard disk drive is adopted by way of example as a detachable storage medium in the present invention, any other media such as read/write DVD/magneto optical disk that have high speed random accessibility are also applicable.

Those media are desired to have both a normal and a secure regions in the case license information is recorded. The secure region is allocated within TRM (Tamper Resistant Module) region of a medium. Reading from and writing in a secure region require specific procedures, and users and application software cannot freely refer to or modify the content of the region. A normal region is the area where users and application software can refer to and modify the content of the region without restriction.

In the present invention, the word license mainly implies information for content utilization and information of the condition for the utilization. For example, an encryption key for decrypting a content encrypted by coding system/encryption system/common key cryptosystem is applicable. Information of the conditions of content utilization are, in addition to aforementioned copy control information, term of utilization and age limit for viewing and listening. As a hard disk drive which has a secure region to which license can be recorded, an iVDR (information Versatile Disk for Removable usage) is under examination. The iVDR is a removable storage possessing a function to record both content and license. Procedure to record images in the storage and to play them back is the same as that of a hard disk recorder currently on the market.

First Embodiment

This embodiment explains a storage device which records encrypted contents onto a removable medium and retains an encryption key for the contents in the storage device. As objective contents, AV data that consist of visual and/or audio data, application programs/data of games and so forth are included in each of the following embodiments. Hereinafter, the present invention will be explained representing AV data as a typical content.

Figure 1:
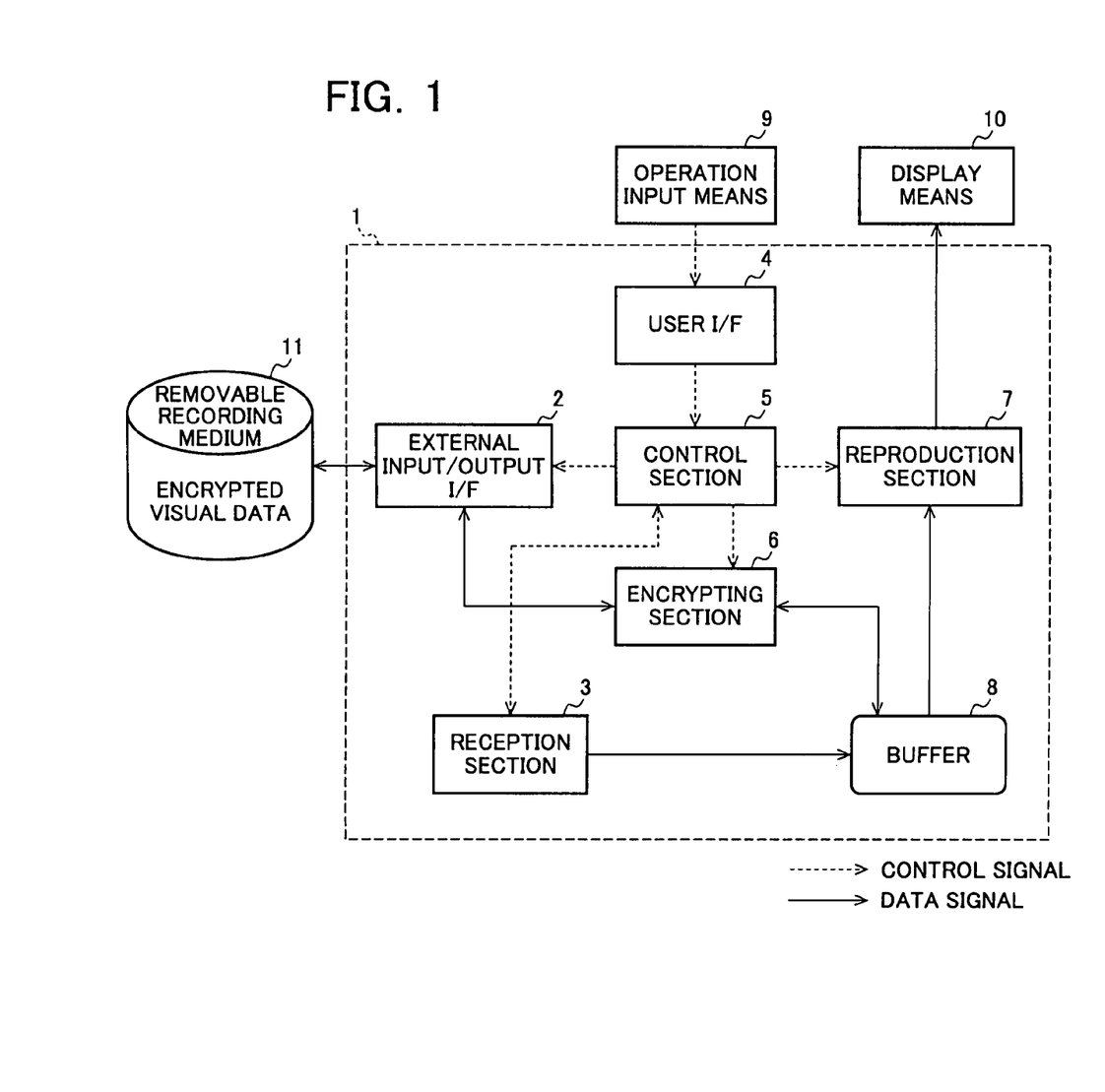
FIG. 1 is a block diagram of a basic structure of a storage device related to an embodiment of the present invention.

FIG. 1 is a block diagram of a basic structure of a storage device related to an embodiment of the present invention. The symbol 1 in the diagram is a storage device, and the storage device 1 consists of an external input/output interface (I/F) 2, a reception section 3 to input AV data as a content (hereinafter, referred to as "visual data"), a user I/F 4 to input operational signals from an operation input means 9, a control section 5 equipped with a CPU and memories to control the storage device 1, an encrypting section 6 to encrypt/decrypt visual data, a reproduction section 7 to play back visual data, and a buffer 8 to temporarily store visual data. The operation input means 9 and display means 10 are arranged combined with or externally connected to the storage device 1. The removable recording medium 11 is arranged independently from the storage device 1 so that it can be connected to and detached from the storage device 1. In the drawing, an arrow in a broken line and that in a solid line show the flows of control signal and data signal, respectively.

Each part described above will be explained more in detail. The external input/output I/F 2 is an interface to interconnect the storage device 1 and removable recording medium 11. The external input/output I/F 2 also possesses an attaching/detaching mechanism of the removable recording medium 11 and a read/write interface. The reception section 3 is a device to input visual data such as, for example, a tuner for receiving digital or analogue broadcasting signal, and an input device such as an IEEE1394 interface is also applicable.

The user I/F 4 is the part where the tuning of digital broadcasting and the selection of operation mode such as recording or play-back of the storage device 1 are done. The control section 5 is the part where each component is controlled according to an input from the user I/F 4. The encrypting section 6 is the part where visual data are encrypted/decrypted. The reproduction section 7 is the part where visual data are played back. The buffer 8 is a buffer memory for the temporary storage of data to be received or played back. The operation input means 9 is a means for a user to operate the storage device 1. The display means 10 is a means for displaying visual data and OSD (On Screen Display) generated by user I/F 4. The removable recording medium 11 mainly records encrypted video (visual) data.

As an interface for the reading and writing of data between the external input/output I/F 2 and the removable recording medium 11, although ATA (AT Attachment) interface is adopted in the present embodiment as an example, USB (Universal Serial Bus) and IEEE1394 interface are also applicable. In the present embodiment, the reception section 3 is a reception means for digital broadcasting signal. As for the data reading and writing modes of the removable recording medium 11 and as for the reception section 3 for receiving digital broadcasting signal are equivalent to a conventional digital broadcast reception section equipped with an internal hard disk drive(s).

The encrypting section 6 encrypts/decrypts visual data by common key cryptosystem as described later. For example, triple DES (Data Encryption Standard) and AES (Advanced Encryption Standard) and so forth are applicable. The reproduction section 7 is a decoder which decrypts visual data.

The operation input means 9 typically implies a remote control section, operation buttons equipped to the storage device 1, etc. The display means 10 implies, for example, a liquid crystal display, a plasma display, EL display and others. The removable recording medium 11 is a removable hard disk drive.

Figure 2:
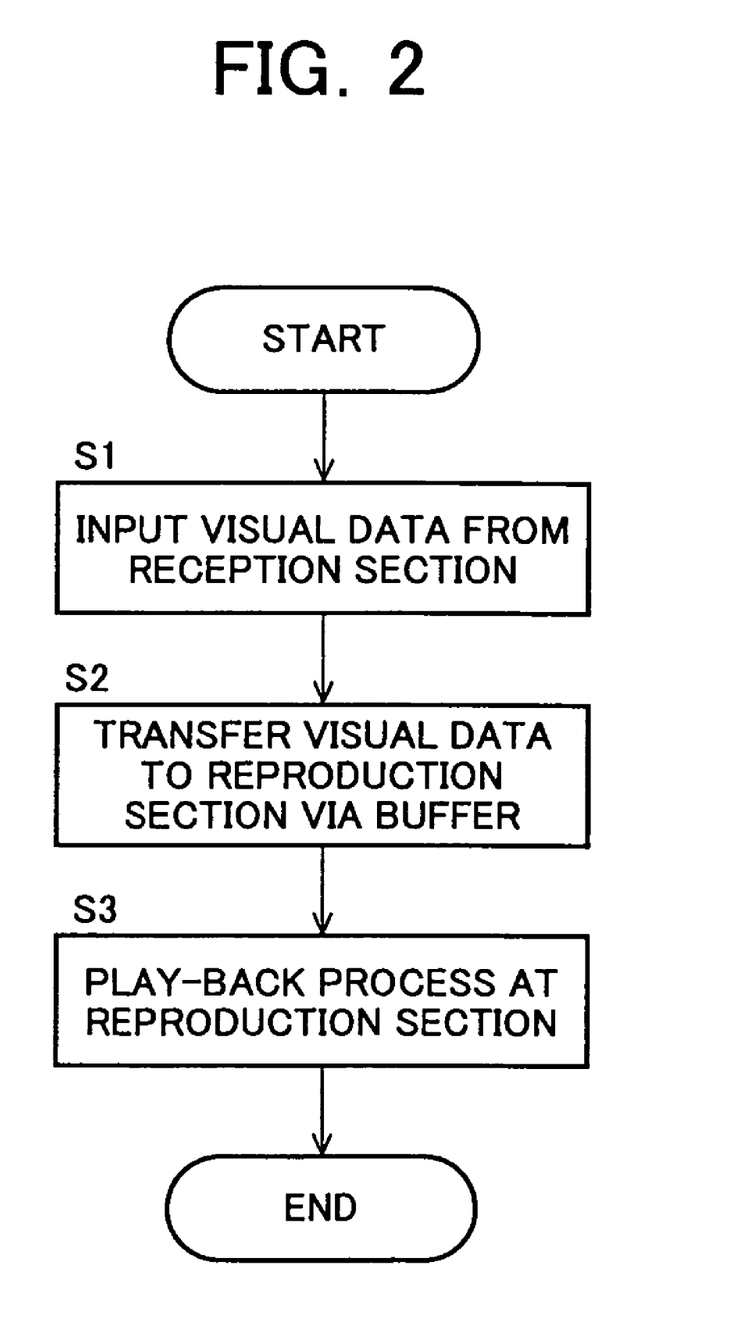
FIG. 2 is a flowchart showing an example of a processing procedure by a storage device related to the first embodiment of the present invention.

FIG. 2 is a flowchart showing an example of a processing procedure by the storage device 1 related to the first embodiment of the present invention. In this instance, a processing at an ordinary state in which temporary storage is not executed is explained.

First, the storage device 1 inputs visual signal from the reception section 3 (Step S1). The visual signal is TS (Transport Stream) or PS (Program Stream) which has tuned on at a digital broadcasting station. Although a channel to be tuned on is not illustrated in the flowchart, the channel has been selected in advance by a user with the operation input means 9 through the user I/F 4. The control section 5 inputs information on a channel to be tuned on from the user I/F 4 to the reception section 3, and the reception section 3 operates channel selection in accordance with the information.

Next, the storage device 1 temporarily stores visual data from the reception section 3 in the buffer 8, and the reproduction section 7 inputs the visual data from the buffer 8 (Step S2). Finally, the reproduction section 7 decrypts the visual data and outputs the visual signal to the display means 10 (Step S3).

The storage device 1 of the present embodiment can also record Copy Free visual data. In this case, visual data input to the buffer 8 from the reception section 3 is recorded in the removable recording medium 11 through the encrypting section 6 and the external input/output I/F 2. In this case, encrypting is not necessarily required at the encrypting section 6. Basic operation of this apparatus is equivalent to that of a conventional digital broadcast reception section equipped with an internal hard disk drive(s).

The storage device 1 of the present embodiment can also play back visual data recorded in the removable recording medium 11. In this case, visual data recorded in the removable recording medium 11 is input to the buffer 8 via the external input/output I/F 2 and the encrypting section 6, then decrypted at the reproduction section 7, and finally visual signal is output to the display means 10. Basic operation of this apparatus is also equivalent to that of a conventional digital broadcast reception section equipped with an internal hard disk drive(s). The operation of storage or play-back is selected via user I/F 4.

Figure 3:
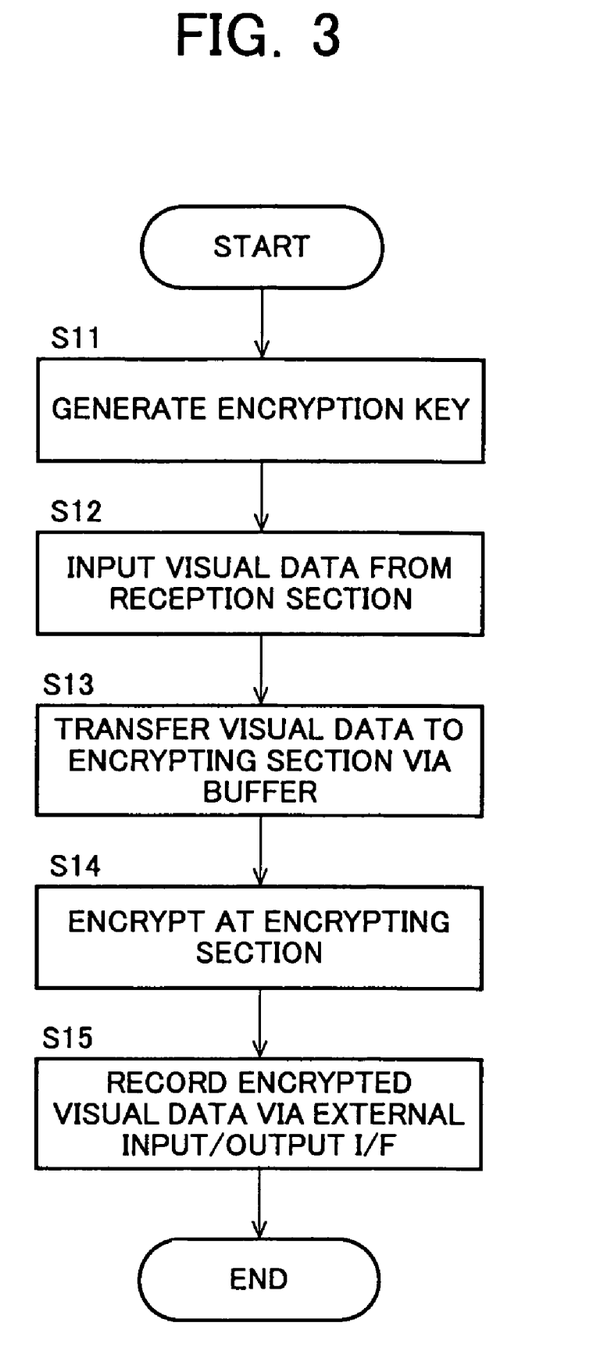
FIG. 3 is a flowchart showing another example of a processing procedure by a storage device related to the first embodiment of the present invention.

FIG. 3 is a flowchart showing another example of a processing procedure by the storage device 1 related to the first embodiment of the present invention. In this instance, a method to temporarily store visual data that can be stored only for a designated term (Copy Never) in the removable recording medium 11. Although it is not illustrated in FIG. 3, digital copy control description elements which are superimposed on visual data has been extracted at the reception section 3, and the information that receiving visual data are Copy Never has been input to the control section 5.

First, in the storage device 1, the control section 5 generates an encryption key Kc as decryption information which is necessary for decrypting encrypted visual data (Step S11). The encryption key Kc is retained in an internal memory equipped to the storage device 1. The encryption key Kc is a key for common key encryption scheme that is generated specifically for every content. The generated encryption key Kc is set at the encrypting section 6. Next, visual data is input from the reception section 3 (Step S12). This process is the same as in the Step S1 shown in FIG. 2. Subsequently, visual data from the reception section 3 is temporarily stored in the buffer 8 (Step S13), and the visual data in the buffer 8 is then encrypted with the encryption key Kc by the encrypting section 6 (Step S14). Next, the storage device 1 records the encrypted visual data in the removable recording medium 11 via the external input/output I/F 2 (Step S15).

At this time, the visual data recorded in the removable recording medium 11 is processed so that the data will be disabled to be played back after the time designated by Retention Lime shown in FIG. 9 has lapsed. The Retention Time is extracted at the reception section 3 and input to the control section 5. The control section 5 executes a process for playback disablement via the external input/output I/F 2. The process for play-back disablement is similar to the so-called scene deletion function of a DVD recorder.

Figure 4:
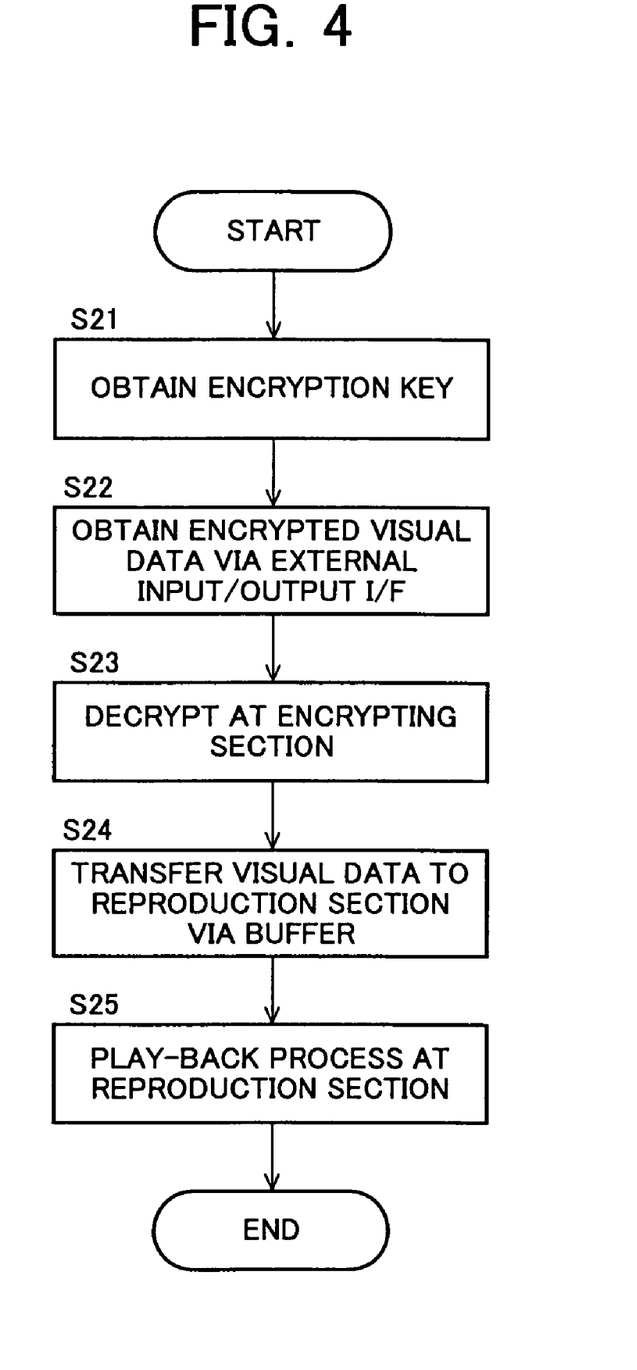
FIG. 4 is a flowchart showing another example of a processing procedure by a storage device related to the first embodiment of the present invention.

FIG. 4 is a flowchart showing another example of a processing procedure by the storage device 1 related to the first embodiment of the present invention. In this instance, a method to play back encrypted visual data that is temporarily stored is explained. First, the storage device 1 obtains an encryption key Kc (Step S21). Visual data stored in a storage cannot be utilized if the removable recording medium 11 is connected to other recordable play-back equipments since the encryption key Kc is retained in the storage device 1 but not on the removable recording medium 11. Next, the storage device 1 obtains the encrypted visual data, which is recorded in the removable recording medium 11, via the external input/output I/F 2 (Step S22). Subsequently, the encrypted visual data is decrypted with the encryption key Kc by the encrypting section 6 and decrypted outcome is written in the buffer 8 (Step S23). The decrypted visual data in the buffer 8 is transferred to the reproduction section 7 (Step S24) to be decrypted and then visual signal is output to the display means 10 (Step S25).

By the method mentioned above, data that is prohibited to be copied by copy control information can be utilized by temporarily storing them in the removable recording medium 11. In the present embodiment, the copy-prohibited data cannot be utilized if the removable recording medium 11 alone is removed because an encryption key Kc is not retained in the removable recording medium 11.

While the reception section 3 is explained as a device to receive digital broadcasting signal for the present invention, it can be replaced with either an analogue broadcasting reception section or an input device such as an IEEE1394 interface. In the case the reception section 3 is a device to receive analogue broadcasting signal, the reception section 3 possesses a function to code visual data into digital signal. Subsequently, in the case the data is prohibited to be copied, the above mentioned operation will be done in accordance with copy control information specified in CGMS (Contents Generation Management System) which is superimposed on analogue signal. On the other hand, in the case the reception section 3 is an IEEE1394 interface, a corresponding operation will be done in accordance with copy control information specified in DTCP. In the present embodiment, Copy Free and Copy Once data are permitted to be utilized as conventional recordable play-back equipments.

Second Embodiment

This embodiment explains a storage device which records encrypted contents (hereinafter, referred to as "visual data") with license information, which includes conditions of usage of the visual data, onto a removable medium.

Figure 5:
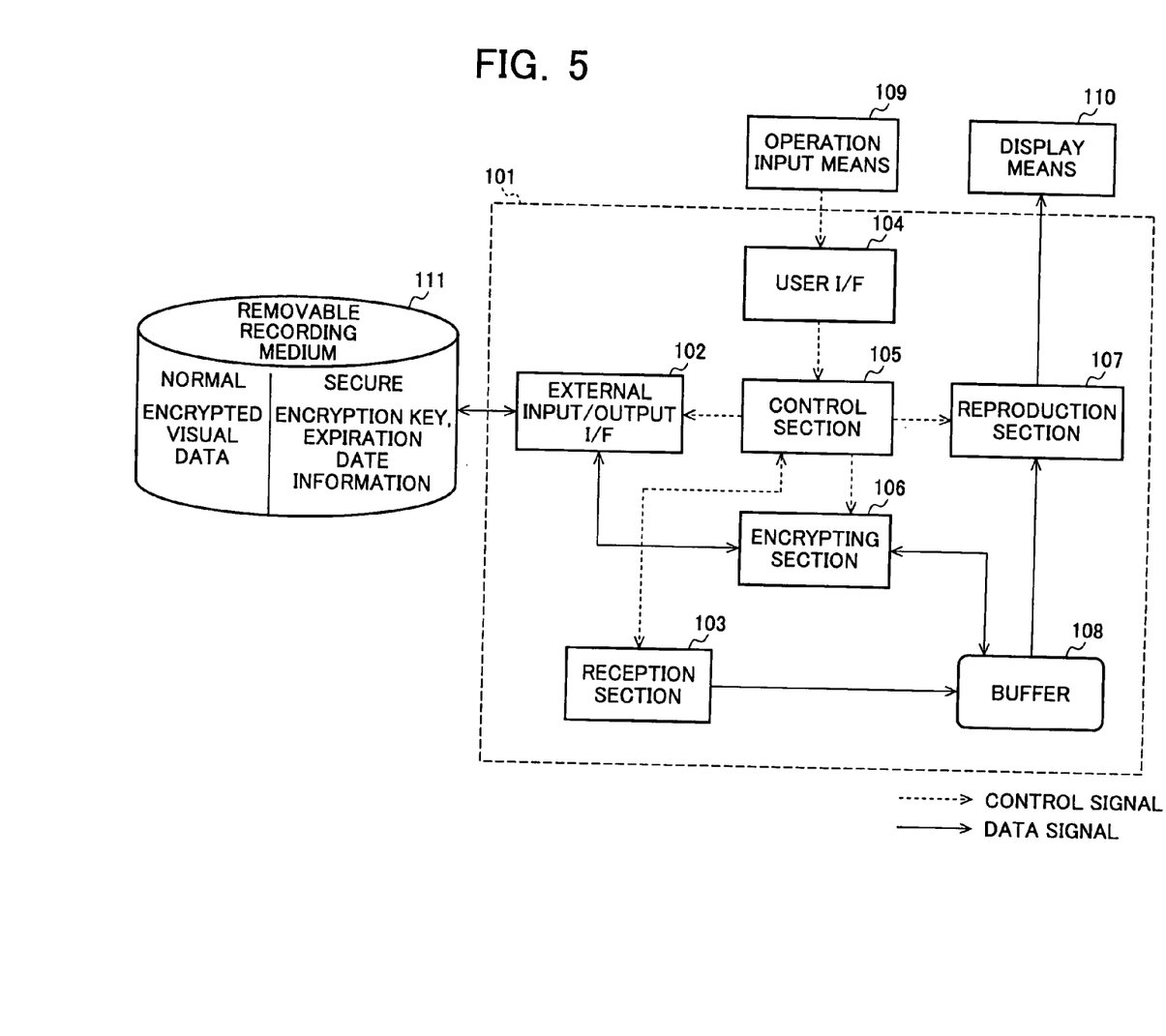
FIG. 5 is a block diagram of a basic structure of a storage device related to another embodiment of the present invention.

FIG. 5 is a block diagram of a basic structure of a storage device related to another embodiment of the present invention. The symbol 101 in the diagram is a storage device, which consists of an external input/output I/F 102, a reception section 103, a user I/F 104, a control section 105, an encrypting section 106, a reproduction section 107, and a buffer 108. The operation input means 109 and display means 110 are arranged combined with or externally connected to the storage device 101. The removable recording medium 111 is arranged independently from the storage device 101 so that it can be connected to and detached from the storage device 101. In the drawing, an arrow in a broken line and that in a solid line show the flows of control signal and data signal, respectively.

The removable recording medium 111 records not only encrypted video (visual) data but also license information in its internal secure region. License information includes an encryption key to decrypt visual data and valid term information (expiration date information) to limit the storage duration of the visual data.

Figure 6:
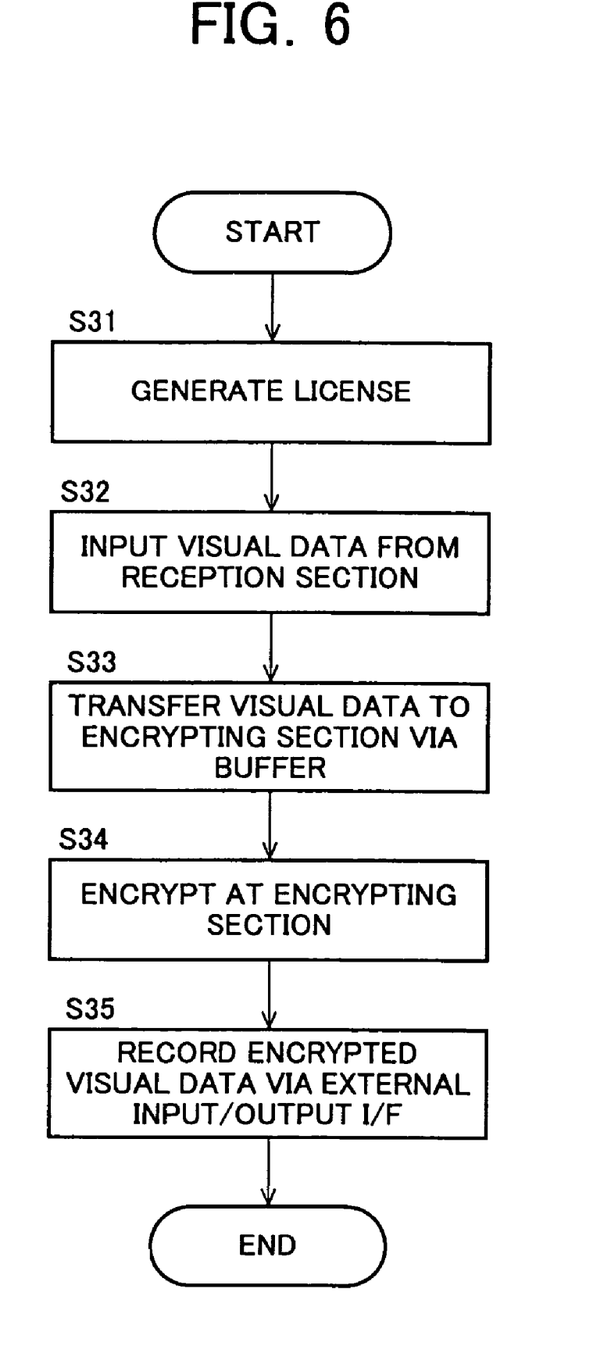
FIG. 6 is a flowchart showing an example of a processing procedure by a storage device related to the second embodiment of the present invention.

FIG. 6 is a flowchart showing an example of a processing procedure by the storage device 101 related to the second embodiment of the present invention. In this instance, a method to temporarily store visual data that can be stored only for a designated term (Copy Never) in the removable recording medium 111. Although it is not illustrated in FIG. 6, digital copy control description elements which are superimposed on visual data has been extracted at the reception section 103, and the information that receiving visual data are Copy Never has been input to the control section 105. Explanation about a processing in an ordinary state in which temporary storage is not executed is omitted here because it is similar to the processing shown in FIG. 2 of the First Embodiment.

First, in the storage device 101, the control section 105 generates license information related to visual data (Step S31). At the same time, an encryption key Kc as decryption information is generated, which is necessary for decrypting encrypted visual data. Information on expiration date is also designated in accordance with Retention Time shown in FIG. 9 in order to limit the duration time of storage of the visual data. License information that includes these information is recorded in a secure region of the removable recording medium 111 via the external input/output I/F 102. Next, the storage device 101 inputs visual data from the reception section 103 (Step S32) and temporarily stores the visual data from the reception section 103 in the buffer 108 (Step S33), and the encrypting section 106 encrypts the visual data in the buffer 108 with the encryption key Kc (Step S34). Subsequently, the storage device 101 records encrypted visual data in the removable recording medium 111 via the external input/output I/F 102 (Step S35).

At this time, as in the first embodiment, the visual data recorded in the removable recording medium 111 is processed so that the data will be disabled to be played back after the time designated by Retention Time has lapsed. The Retention Time is extracted at the reception section 103 and input to the control section 105. The control section 105 executes a processing for play-back disablement via the external input/output I/F 102. The processing for play-back disablement can be realized by a method similar to the so-called scene deletion function of a DVD recorder. The control section 105 also executes an updating processing of expiration date information included in license information. In this process, the control section 105 counts the duration time for which the visual data has been stored in the removable recording medium 111 and executes an updating processing in accordance with the duration time counted. License information including the updated expiration date information is retained in the removable recording medium 111.

Figure 7:
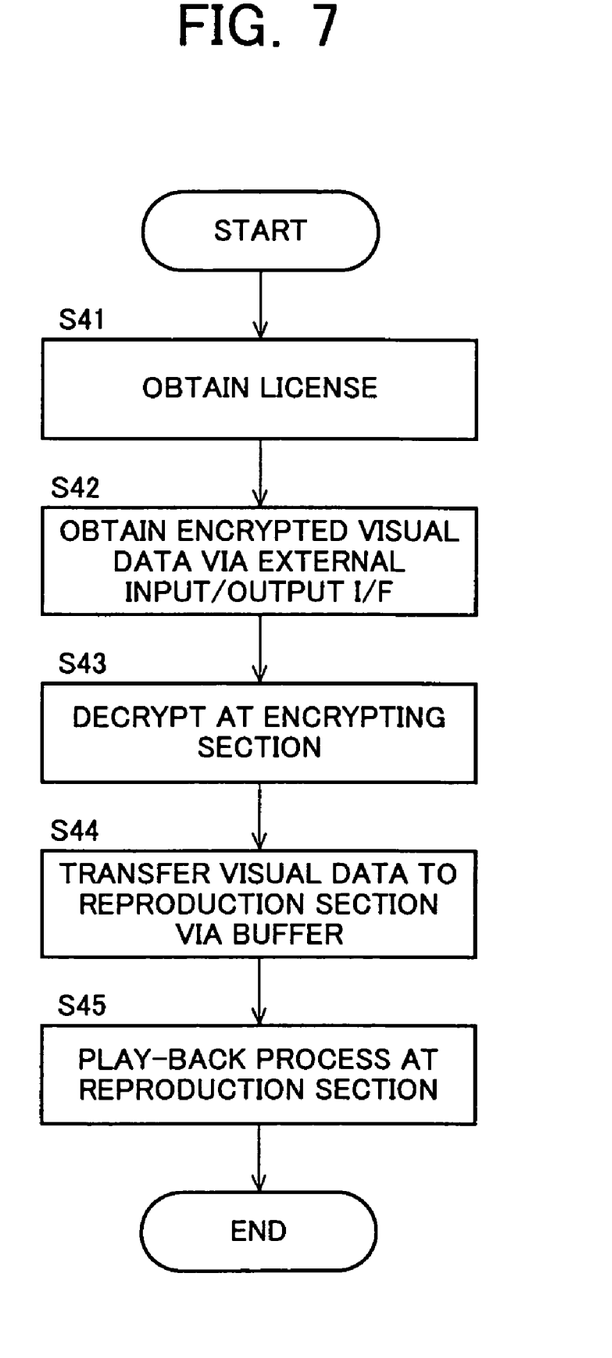
FIG. 7 is a flowchart showing another example of a processing procedure by a storage device related to the second embodiment of the present invention.

FIG. 7 is a flowchart showing another example of a processing procedure by the storage device 101 related to the second embodiment of the present invention. In this instance, a method to play back visual data that is temporarily stored is explained. First, the storage device 101 obtains license information (Step S41). In the present embodiment, recorded visual data can be utilized even in the case the removable recording medium 111 is connected to a different recording/reproducing equipment since license information is retained in the removable recording medium 111. Next, the storage device 101 obtains the encrypted visual data, which is recorded in the removable recording medium 111, via the external input/output I/F 102 (Step S42). Subsequently, the encrypted visual data is decrypted with the encryption key Kc by the encrypting section 106 and decrypted outcome is written in the buffer 108 (Step S43). The decrypted visual data in the buffer 108 is transferred to the reproduction section 107 (Step S44) to be decrypted and then visual signal is output to the display means 110 (Step S45).

By the method mentioned above, data that is prohibited to be copied by copy control information can be utilized by temporarily storing them in the removable recording medium 111. In the present embodiment, license information including expiration date information of copy-prohibited data can be retained in the removable recording medium 111, and in addition, as expiration date information of copy-prohibited data is updated, license information including the updated expiration date information is retained in the removable recording medium 111. In this case, copy-prohibited data cannot be utilized beyond an expiration date even in the case the storage device 101 is forced to stop by power off or other reasons and started again afterwards. However, if the removable recording medium 111 is connected to different recording/reproducing equipment, the copy-prohibited data can be utilized within its expiration date. Besides, based on the present embodiment, since the removable recording medium 111 does not need to have a built-in timer and other additional parts, it is possible to avoid the increase of manufacturing costs by its simple structure.

In the first and second embodiments explained above, encrypted video (visual) data can be recorded in a removable recording medium being identified as temporarily stored data. Some examples of methods of data identification are as follows:

(1) Assignment of a specific file name when a data set is recorded as a file.

(2) Creation of a data index which is given an attribute retaining information of temporary storage.

(3) In the second embodiment, allocation of an attribute of temporary storage to license information.

It is also worth considering that a temporarily stored data set identified by any of the methods described above is deleted when a storage device is initialized. By doing so, it is possible to utilize the recording area of a removable recording medium efficiently without losses as well as to prohibit to utilize data beyond utilization limit. In the second embodiment, when an expiration date limit included in license information expires, similar results to those described above can be obtained by deleting a corresponding data set.

Third Embodiment

Figure 8:
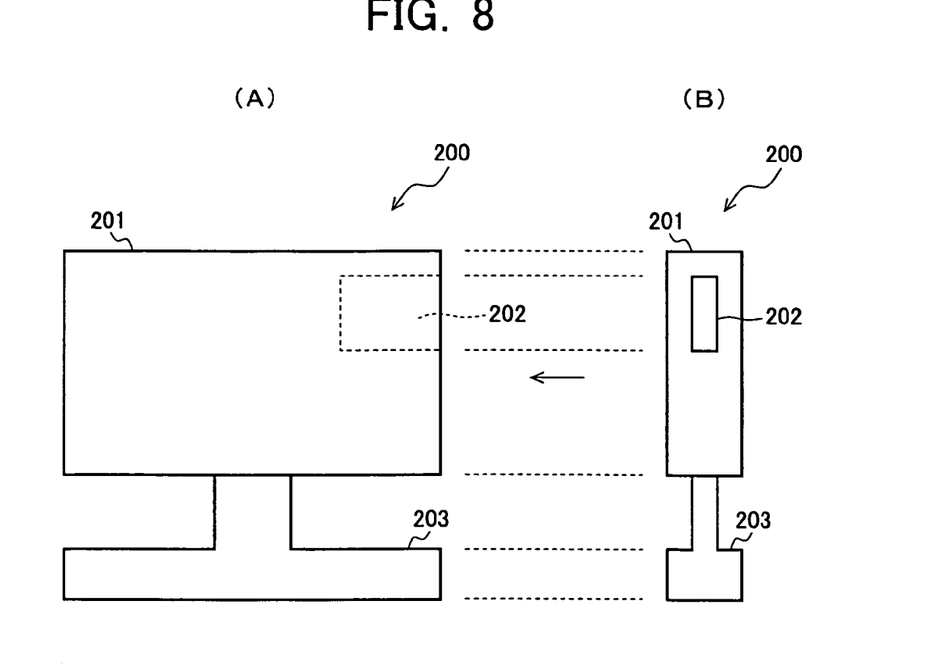
FIG. 8 shows an example of the external appearance of an image display device equipped with a storage device related to the present invention.

FIG. 8 shows an example of the external appearance of an image display device equipped with a storage device related to the present invention. In the figure, the symbol 200 is an image display device which is equipped with a display means 201 that visualize visual data, an external input/output I/F 202 for detachable connection of a removable recording medium which is not illustrated in the figure, and a holding section to hold the display means 201. The image display device 200 has a built-in storage device which is not shown in the figure, and the storage device is removably connected with a removable recording medium via the external input/output I/F 202. FIG. 8(A) is the front view of the image display device 200, and FIG. 8(B) is the side view of the image display device 200 shown in FIG. 8(A) viewing from the direction indicated by an arrow.

In the present embodiment, the basic structure of a storage device to be built in the image display device 200 is the same as that of the storage device explained in the first embodiment or the second embodiment. In this way, the temporary storage of Copy Never data can be done, and further, the temporary storage of Copy Free and Copy Once visual data will be possible and time shift function is available for them. This is explained below with the storage device 1 shown in FIG. 1 as a typical example.

When Copy Never visual data (visual data with limited storage term) is input from a storage device 1, the image display device 200 encrypts the visual data at an encrypting section 6 and temporarily stores them in a removable recording medium 11 as encrypted visual data. On the other hand, when Copy Free or Copy Once visual data are input from the storage device 1, the visual data are temporarily stored in the removable recording medium 11. At this time, the visual data may be encrypted at the encrypting section 6. The image display device 200 has a time shift function that is realized by temporarily storing those Copy Never, Copy Free or Copy Once visual data in the removable recording medium 11. While the time shift function has been realized in a recorder equipped with an internal hard disk drive(s), the image display device 200 in the present embodiment, can realize the time shift function with the removable recording medium 11. This means that visual data can be played back with a designated shift (delay) of time while the data are being stored temporarily in the removable recording medium 11.

In the same way as in the first embodiment and the second embodiment, the image display device 200 in the present embodiment also can record encrypted video (visual) data in a removable recording medium as identifying them as temporarily stored data. Further, the method explained in the present embodiment can improve facility for users since the time shift function can be utilized even in an image display device which only has a display function by realizing the temporary storage function with a removable recording medium.

In the present embodiment, the external input/output I/F 202 is arranged to be built in the display means 201. However, the arrangement is not strictly determined as is shown, but can be built in or connected to a different part of the image display device, e.g., the holding section 203.

The invention claimed is:

1. A storage device storing broadcasting data in a removable hard disk having a tamper resistant module (TRM) region, comprising:
   a processor which receives broadcasting data that includes copy control information, the copy control information limits the storage period of the broadcasting data, wherein the receiving section extracts the copy control information from the broadcasting data while the broadcasting data is in the unencrypted state;
   the processor encrypts the broadcasting data whose storage period is limited; and
   the processor stores the encrypted broadcasting data in the removable hard disk, wherein the processor generates license information including both decryption information required to decrypt the encrypted broadcasting data and expiration date information for limiting storage period of the encrypted broadcasting data in accordance with the copy control information and stores the generated license information in the TRM region of the removable hard disk before storing the encrypted broadcasting data in the removable hard disk, and wherein the processor updates the expiration date information stored in the TRM region of the removable hard disk while the processor stores encrypted broadcasting data in the removable hard disk.

2. The storage device as defined in claim 1, wherein the processor counts the period for which the broadcasting data is stored in the removable hard disk and updates expiration date information of the broadcasting data in accordance with the period counted.

3. The storage device as defined in claim 1 or 2, wherein the processor is enabled to store the broadcasting data together with attribute information for identification of the broadcasting data in the removable hard disk.

4. The storage device as defined in claim 3, wherein the processor deletes the broadcasting data whose expiration date is expired when the storage device is initialized.

5. A storage method by a storage device for storing broadcasting data in a removable hard disk having a tamper resistant module (TRM) region, comprising the steps of:
   receiving broadcasting data that includes copy control information, the copy control information limits the storage period of the broadcasting data by the storage device;
   extracting the copy control information from the broadcasting data while the broadcasting data is in an unencrypted state;
   generating license information including both decryption information required to decrypt the encrypted broadcasting data and expiration date information for limiting storage period of the encrypted broadcasting data in accordance with the copy control information and storing the generated license information in the TRM region of the removable hard disk,
   encrypting the broadcasting data whose storage period is limited; and
   storing the encrypted broadcasting data in the removable hard disk,
   wherein said step of storing the encrypted broadcasting data is performed after the step of storing the generated license information and includes updating the expiration date information of the broadcasting data and storing the updated expiration date information in the TRM region of the removable hard disk.

6. An image display device having an input/output unit to removably connect a removable hard disk having a tamper resistant module (TRM) region and a storage unit to temporarily store broadcasting data in the removable hard disk, comprising:
   a processor that receives broadcasting data that includes copy control information, the copy control information limits the storage period of the broadcasting data;
   the processor extracts the copy control information from the broadcasting data while the broadcasting data is in an unencrypted state;
   the processor encrypts the broadcasting data whose storage period is limited; and
   the processor stores the encrypted broadcasting data in the removable hard disk, wherein
   the processor generates license information including both decryption information required to decrypt the encrypted broadcasting data and expiration date information for limiting storage period of the encrypted broadcasting data in accordance with the copy control information and stores the generated license information in the TRM region of the removable hard disk before storing the encrypted broadcasting data in the removable hard disk, and
   wherein the processor updates the expiration date information stored in the TRM region of the removable hard disk while the processor stores the encrypted broadcasting data in the removable hard disk.

* * * * *